(12) United States Patent
Raguse

(10) Patent No.: US 7,044,519 B2
(45) Date of Patent: May 16, 2006

(54) COLLECTING AND UNLOADING DEVICE AND METHOD

(75) Inventor: Lyle Raguse, Wheaton, MN (US)

(73) Assignee: Starling Mfg. Inc., Wheaton, MN (US)

( * ) Notice: Subject to any disclaimer, the term of this patent is extended or adjusted under 35 U.S.C. 154(b) by 0 days.

(21) Appl. No.: 10/907,076

(22) Filed: Mar. 18, 2005

(65) Prior Publication Data
US 2005/0151383 A1    Jul. 14, 2005

Related U.S. Application Data

(63) Continuation-in-part of application No. 10/458,964, filed on Jun. 11, 2003, now abandoned.

(51) Int. Cl.
*B65B 67/12* (2006.01)

(52) U.S. Cl. .................. 294/55; 294/1.1; 15/257.3; 248/99

(58) Field of Classification Search ............. 294/1.1, 294/1.3–1.5, 19.2, 55; 15/257.1, 257.3; 383/41, 383/906; 248/99–101
See application file for complete search history.

(56) References Cited

U.S. PATENT DOCUMENTS

| | | | | |
|---|---|---|---|---|
| 834,770 A * | 10/1906 | Steele | ................. | 15/257.2 |
| 961,199 A * | 6/1910 | Armstrong | ................. | 15/257.3 |
| 1,224,568 A * | 5/1917 | Ream | ................. | 141/390 |
| 2,064,696 A * | 12/1936 | Smith et al. | ................. | 43/55 |
| 2,617,281 A * | 11/1952 | Jones | ................. | 15/257.2 |
| 2,710,196 A * | 6/1955 | Larson | ................. | 280/654 |
| 3,017,653 A * | 1/1962 | Bird | ................. | 15/257.8 |
| 3,276,807 A | 10/1966 | Ward | | |
| 3,614,149 A | 10/1971 | Clark | | |
| 3,711,141 A * | 1/1973 | Soergel | ................. | 294/55 |
| 3,733,099 A * | 5/1973 | Szita | ................. | 294/55 |
| 3,806,984 A * | 4/1974 | Hilsabeck | ................. | 294/1.3 |
| 3,942,831 A * | 3/1976 | Sosnove | ................. | 294/1.4 |
| 4,270,788 A * | 6/1981 | Overholt | ................. | 294/55 |
| 4,457,549 A * | 7/1984 | Lowery | ................. | 294/55 |
| 4,787,584 A * | 11/1988 | Palmer | ................. | 248/99 |
| 4,799,725 A * | 1/1989 | Anderson | ................. | 294/19.2 |
| 4,919,546 A * | 4/1990 | Imazeki et al. | ................. | 383/33 |
| 4,981,274 A * | 1/1991 | McVay et al. | ................. | 248/99 |
| 5,011,103 A * | 4/1991 | Hayes et al. | ................. | 248/99 |
| 5,050,920 A * | 9/1991 | Potticary | ................. | 294/55 |
| 5,110,168 A | 5/1992 | Petrillo | | |
| 5,328,220 A | 7/1994 | McPherson | | |
| 5,365,632 A * | 11/1994 | Kirchnavy | ................. | 15/257.3 |
| 5,513,884 A * | 5/1996 | Bucher | ................. | 294/19.2 |
| D393,300 S | 4/1998 | Andrews et al. | | |
| 5,738,315 A * | 4/1998 | Kent, Jr. | ................. | 248/97 |
| 5,738,400 A * | 4/1998 | Chambless | ................. | 294/19.1 |
| 5,806,815 A * | 9/1998 | Knutson | ................. | 248/99 |
| 5,863,258 A | 1/1999 | Fulop | | |
| 5,915,769 A * | 6/1999 | Kidd | ................. | 294/1.4 |
| 5,947,602 A * | 9/1999 | Coxsey | ................. | 383/33 |
| 5,951,075 A | 9/1999 | Green | | |
| 6,052,860 A * | 4/2000 | Coxsey | ................. | 15/257.2 |
| 6,276,645 B1 * | 8/2001 | Chang | ................. | 248/99 |
| 6,485,073 B1 * | 11/2002 | Harrison | ................. | 294/1.4 |

* cited by examiner

Primary Examiner—Dean J. Kramer
(74) Attorney, Agent, or Firm—Hahn Loeser + Parks LLP; Bret A. Hrivnak

(57) ABSTRACT

A device and method for collecting and removing various objects, such as balls and lawn refuse, from the ground is described. The collection device comprises an elongated handle connected to a frame assembly. Secured to the frame assembly is a bag wherein objects are collected as the device is pushed by an individual via the elongated handle. An outlet exists for the user to unload the collected objects.

17 Claims, 9 Drawing Sheets

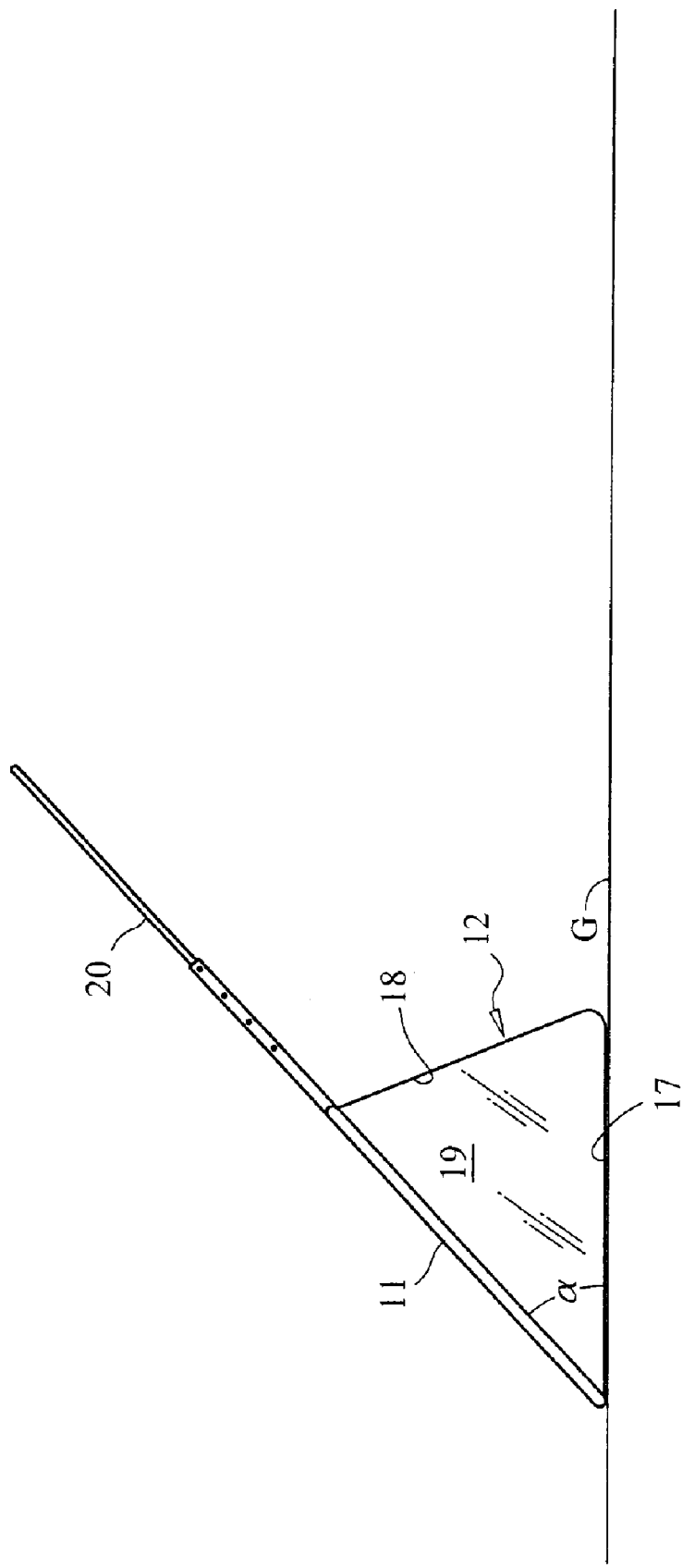

COLLECTING AND UNLOADING DEVICE AND METHOD

This application claims priority from utility patent application Ser. No. 10/458,964, filed Jul. 11, 2003, the disclosure of which is hereby incorporated by reference now abandoned.

TECHNICAL FIELD

The present invention relates to a collecting and unloading device, and more particularly, to a device for collecting and unloading matter, such as balls and lawn refuse. Other aspects of the invention relate to a method for preparing such a collecting and unloading device.

BACKGROUND AND SUMMARY OF THE INVENTION

The present invention is directed to an improved device and method for collecting, removing, and unloading matter, such as balls and lawn refuse.

In a first embodiment, a collecting and unloading device comprises: a substantially rectangular frame comprising an upper bar, a lower bar, and two opposing side bars; a bag having an inlet and an outlet, wherein the bag operably attaches to said frame, the frame being substantially adjacent the inlet and the outlet being substantially adjacent a side bar; and an elongated handle secured to said upper bar of said frame.

In a second embodiment, a collecting and unloading device comprises: a substantially rectangular frame comprising an upper bar, a lower bar, and two opposing side bars; a bag having at least one opening and being operably attached to said frame, wherein the at least one opening forms an inlet and an outlet, the inlet being adjacent the frame and separated from the outlet by a side bar; and an elongated handle secured to said upper bar of said frame.

In a third embodiment, a method of collecting and unloading one or more objects comprises: positioning adjacent a surface either device described in each of the previous two paragraphs; grasping said handle; pushing said device via said handle along said surface toward at least one object to be collected, such that said lower bar slides underneath said at least one object, thereby moving said at least one object into said bag for collection; and tilting said device by rotating the handle about a central axis of the handle, such that at least one of the at least one objects exits the device via the outlet, thereby unloading at least one of the at least one objects from the device.

BRIEF DESCRIPTION OF THE DRAWINGS

FIG. 2 is a side view of the inventive collecting device illustrated in FIG. 1.

DETAILED DESCRIPTION OF THE INVENTION

The present invention is directed to an improved device and method for collecting and removing various objects, such as balls and lawn refuse. As used herein "balls" include, but is not limited to, tennis balls, golf balls, volleyballs, basketballs, kick balls, and racquetballs. As used herein "lawn refuse" includes, but is not limited to, fallen leaves, pine straw, grass, plant and tree cuttings, dead plants, and the like as well as other organic and inorganic waste matter found on the ground of a lawn, for example.

Figure 1:
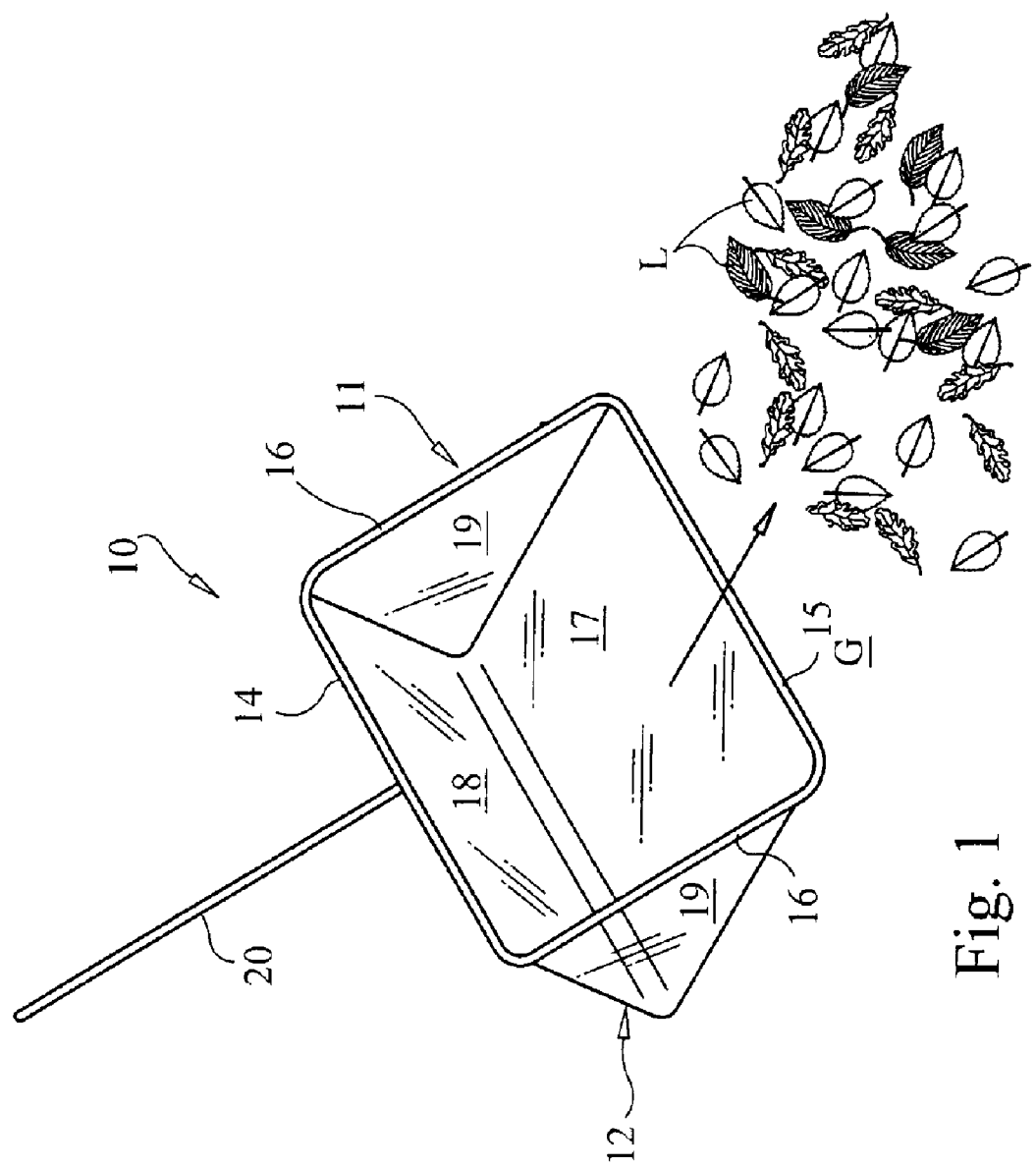
FIG. 1 is a elevated perspective view of one embodiment of the present invention.

Referring now to the figures, the present invention is directed to a device 10 comprising a frame 11 and a bag 12. In one embodiment of the present invention, the frame is substantially rectangular in shape. As used herein, "substantially rectangular" is defined to describe a variety of parallelograms, wherein the opposite sides are substantially parallel and equal to one another. The phrase includes rectangles (as shown in FIG. 1, for e.g., wherein one pair of sides has a different length than the adjacent pair of sides) as well as true squares (all four sides are of equal length) wherein adjacent sides form right angles to one another. The phrase "substantially rectangular" is also defined herein more broadly to include parallelograms wherein adjacent sides do not form right angles to one another. Moreover, the phrase "substantially rectangular" also includes four-sided planar configurations with rounded corners (as shown in the figures) as well as non-rounded corners (not shown).

Figure 3:
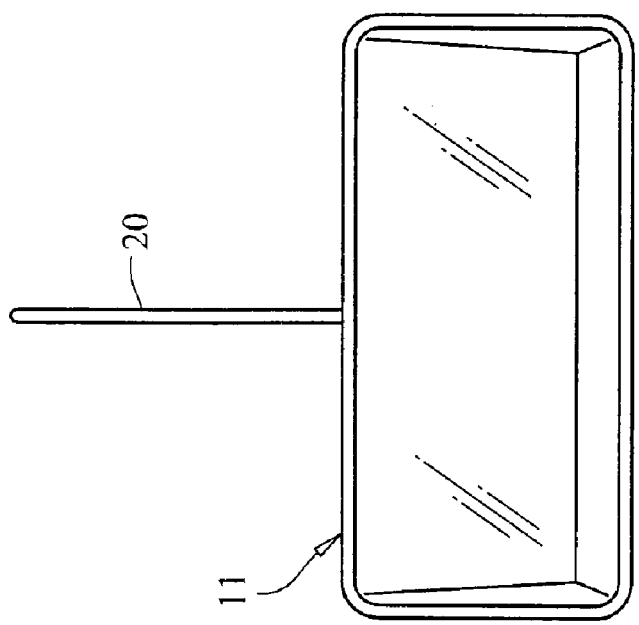
FIG. 3 is a top front view of the inventive collecting device illustrated in FIG. 1.
Figure 6:
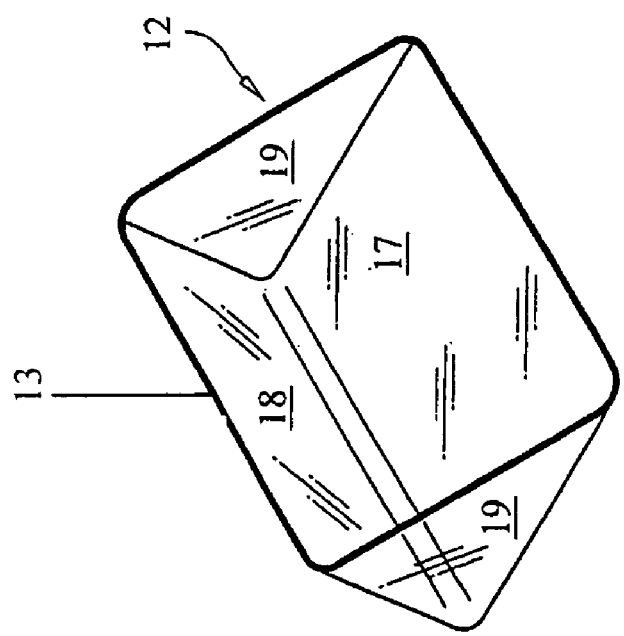
FIG. 6 is an elevated perspective view of the bag portion of the collecting devices of the present invention.
Figure 11:
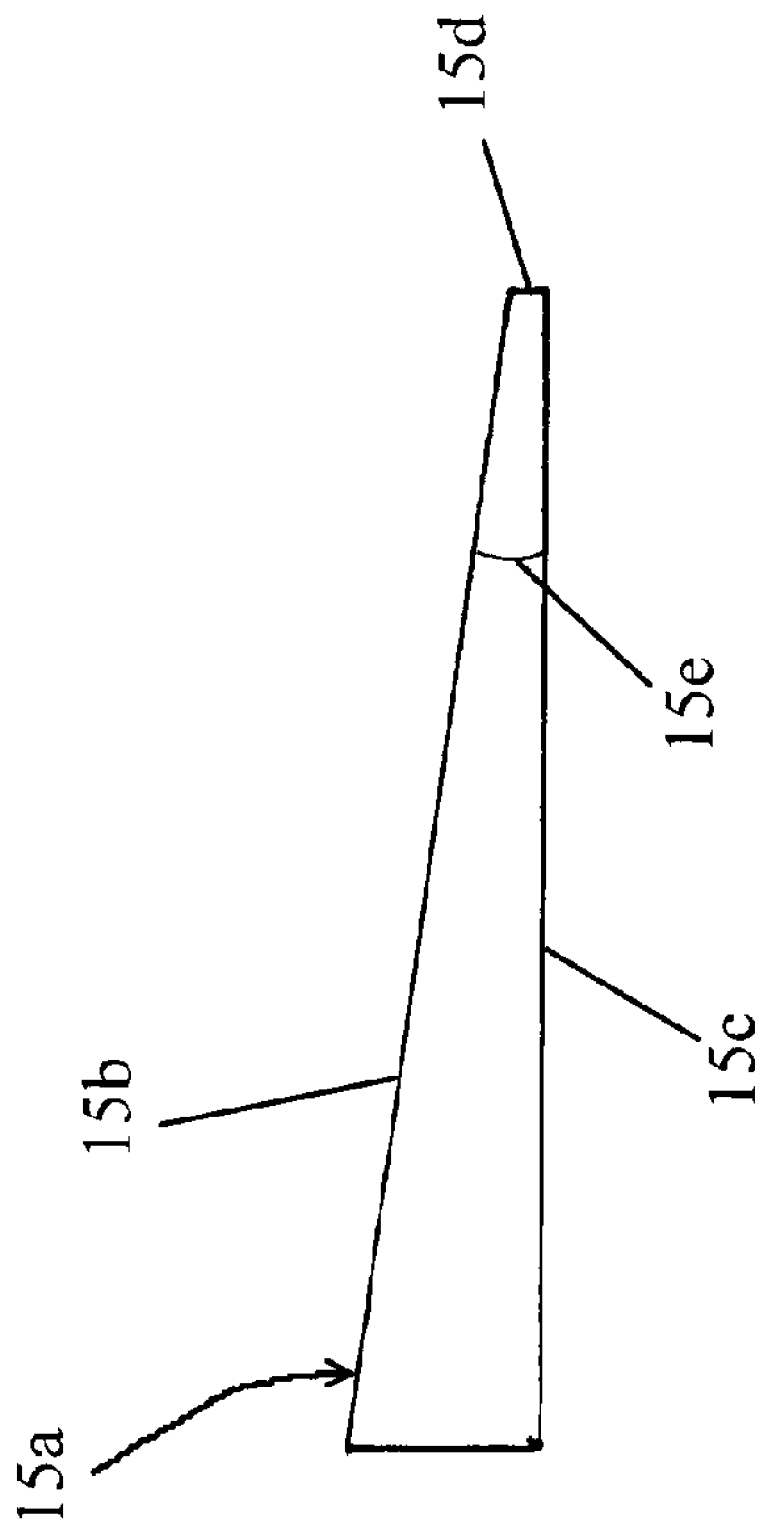
FIG. 11 is a sectional view of an alternative embodiment of the lower bar of the present invention.

The bag 12 has an outer periphery 13, defining a first bag opening, that is configured to be secured to the frame (see FIG. 6). FIGS. 1–3 illustrate one embodiment of the present invention, wherein the device comprises a frame 11 having an upper bar 14, a lower bar 15 parallel to the upper bar 14, and two opposing side bars 16 perpendicular to, and contiguous with, the upper and lower bars 14, 15. In an alternative embodiment, the lower bar 15a, as well as any other bar 14, 16, may be substantially flat and thin to improve its ability to collect objects (collectability)(see FIG. 11). This includes having the lower bar 15a made from common sheet or plate material, which at least has a substantially flat top surface 15b, or a material having a substantially triangular cross-section, where a substantially flat top surface 15b and a flat bottom surface 15c converge to a leading edge 15d at an acute angle 15e. It is contemplated that surfaces 15b, 15c may converge to form leading edge 15d, or leading edge 15d may be a round or flat surface extending between surfaces 15b, 15c. The bag 12 may be permanently secured to the frame by conventional fastening means know by those of skill in the art (e.g. adhesive, bolts, screws, and the like) or removably secured by conventional fastening means know by those of skill in the art (e.g. VELCRO, snaps, ties, zippers, string, wire, elastomeric bands, clamps, clips, magnets and the like). For ease of illustration, the fastening means are not illustrated in the figures.

The bars forming the frame 11 may be manufactured from PVC or aluminum tubing, solid rods, solid bars, sheet, or plate, as well as other types of durable plastic or metal tubing or rods. A smooth, light-weight material aids in maneuverability and loading. The width or diameter size of the tubing or rod used may vary as desired; however, a diameter (or width) size of 0.5 inch is generally acceptable to carry 5-pound maximum loads.

The bag 12 as shown in the figures comprises a horizontal floor portion 17 extending from the lower bar 15 and is contiguous with a rear wall portion 18 that extends downward from the upper bar 14 of the frame. The bag 12 further comprises two side portions 19 extending from the respective side bars 16. As illustrated in FIGS. 1–2, and 6, for example, the side wall portions 19 have a substantially triangular configuration while the floor and rear wall portions of the bag have a substantially rectangular configuration. In certain embodiments, the bag may be formed of a durable material, such as polyethylene and other suitable plastics, canvas, and the like. Material may be have a smooth or slick surface (e.g. vinyl and other similarly smooth plastics) to provide minimal frictional contact between the outer side of the floor 17 and the ground G, thereby allowing the bag 12 to slide freely along the ground during the collection process. In the present embodiment, the material used is also durable, strong, and water and weather resistant. The bag may be used permanently, or it may be disposable, if desired.

Figure 8:
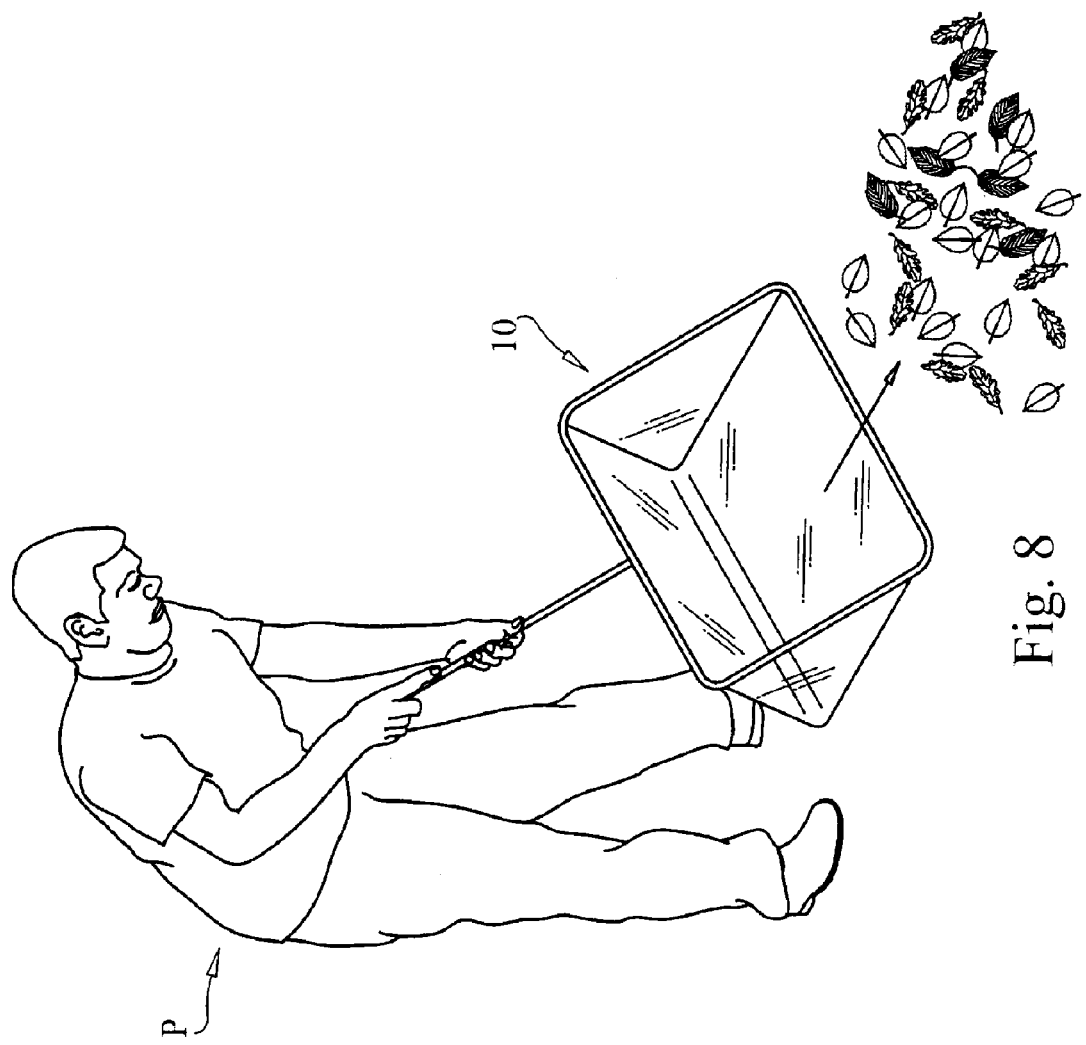
FIG. 8 is an elevated perspective view of the embodiment shown in FIG. 1, further illustrating the operation of the invention by a person.

As illustrated most clearly in FIGS. 1–2, the frame 11 can be described as lying in a plane that is positioned at an acute angle α (i.e. less than 90 degrees) rearward relative to the ground G or horizontal floor portion 17 of the bag. Angle α may be about 45 degrees. To operate the device, a person P may stand behind the device 10, grasping the elongated handle 20 that is secured to or integral with the upper bar 14 of the frame 111 (see FIG. 8, for e.g.). As shown, the handle 20 may be oriented within the same acute angle α relative to the ground G or floor portion 17 of the bag as is the plane of the frame 11. The person may then push the device forward in the direction of the arrow (FIGS. 1 and 8), thereby sliding the floor portion 17 of the bag and lower bar 15 of the frame along the ground. When the lower bar 17 comes in contact with the objects, such as leaves L, for example, the lower bar 14 and floor portion 17 slide underneath the objects. By selecting materials for the frame, such as smooth, lightweight metals or plastic materials, as well as smooth plastics or canvas materials for the bag, the device may be easily maneuvered along the ground G.

Figure 7:
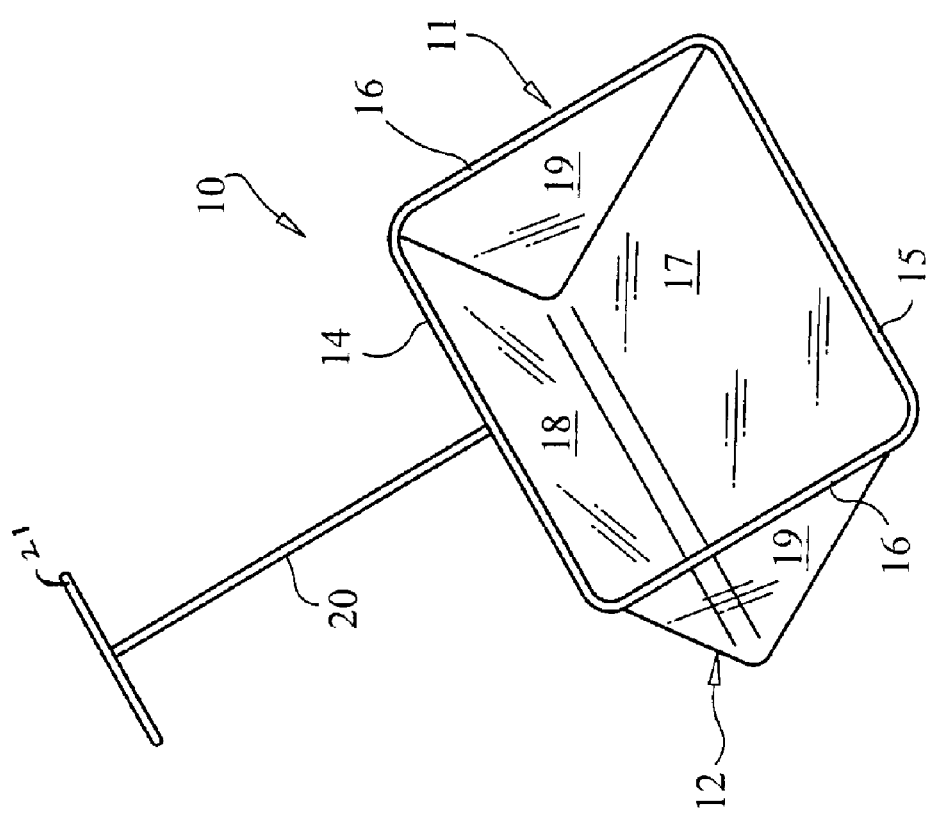
FIG. 7 is an elevated perspective view of a fourth embodiment of the inventive collecting device.

As shown in the figures, the handle 20 may be straight (FIGS. 1–4) or it may be bent slightly downward (FIG. 5), if desired to aid in handling. The handle 20 may be a single solid piece or it may comprise two or more segments contiguous with one another or secured to one another in a telescopic fashion (i.e. an adjustable tube within a tube to provide length adjustment) (not shown). Handle 20 may include a molded hand grip. FIG. 7 illustrates another embodiment of the collecting device wherein the handle includes a T-shaped hand grip 21.

Figure 4:
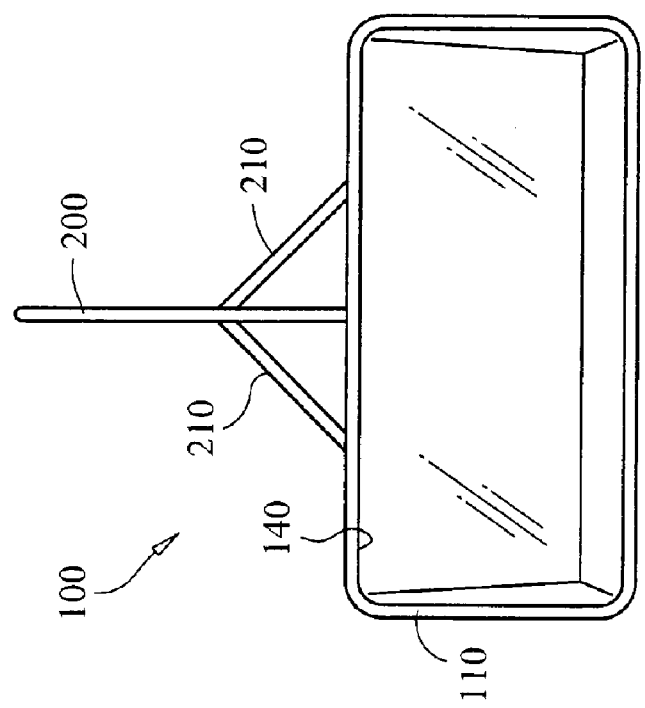
FIG. 4 is a top front view of a second embodiment of the inventive collecting device.
Figure 5:
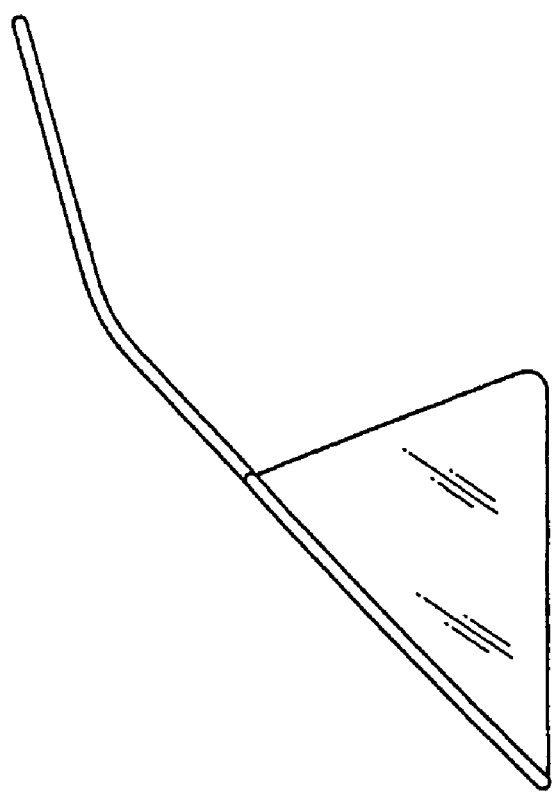
FIG. 5 is a side view of third embodiment of the inventive collecting device.

FIG. 4 illustrates another embodiment of the present invention, wherein secured to the upper bar 140 of the frame 110 and handle 200 are a pair of support arms 210. These support arms 210 provide added stability or support to the handle, especially for embodiments wherein the frame and bag may be heavier or larger and/or when particularly large quantities of objects are to be collected prior to emptying of the bag.

Figure 9:
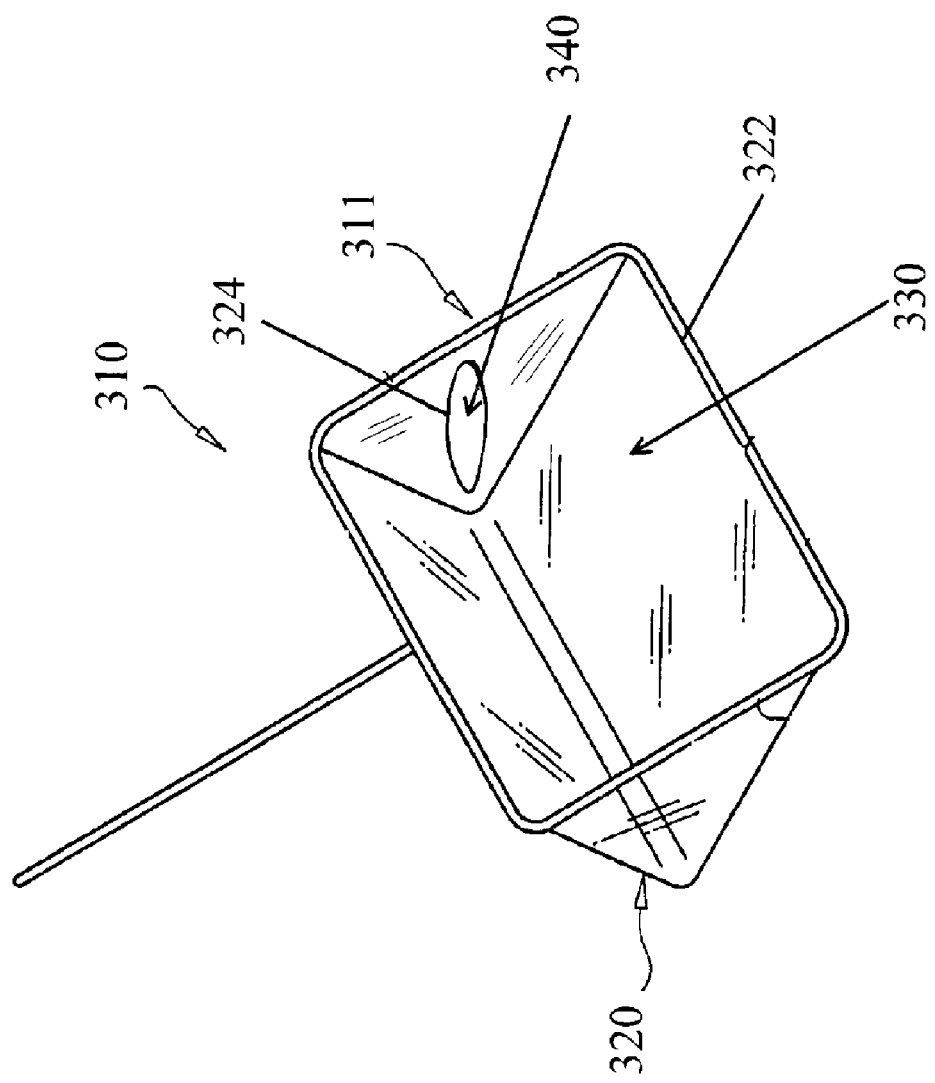
FIG. 9 is a perspective view of an alternative embodiment of the present invention.
Figure 10:
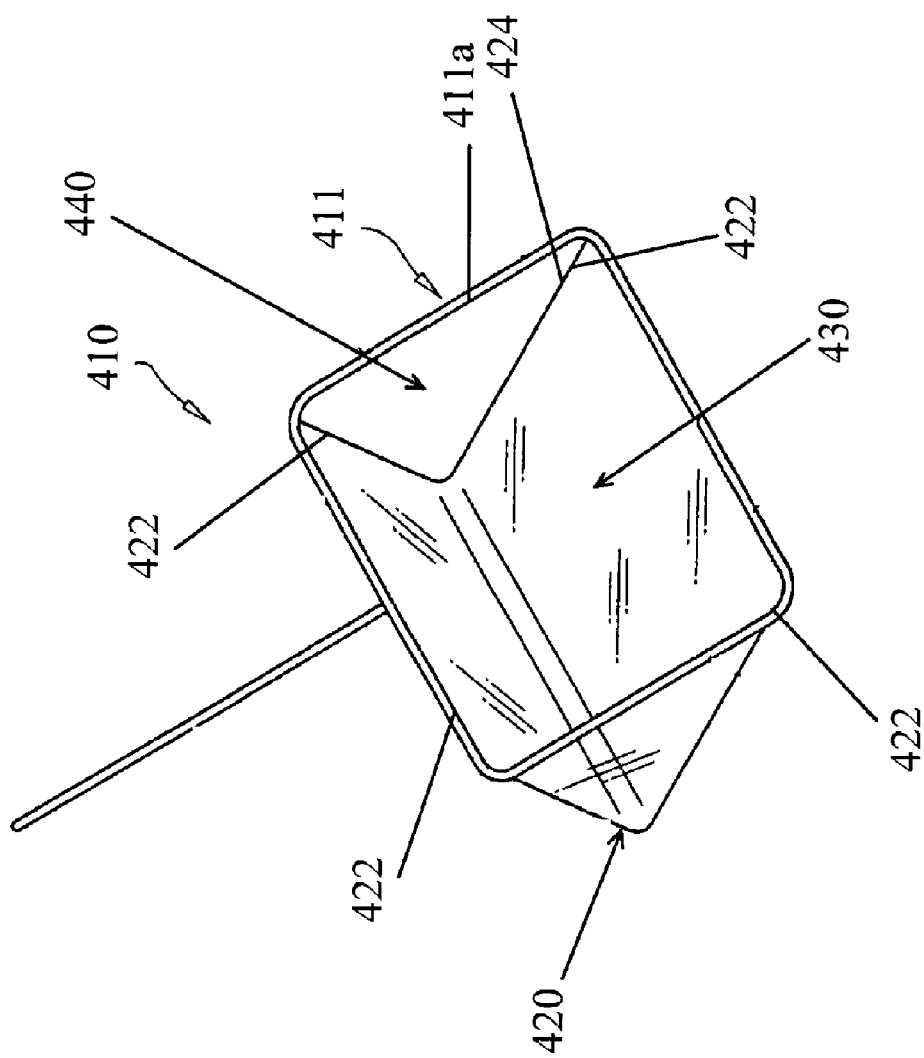
FIG. 10 is a perspective view of an alternative embodiment of the present invention.

In still another embodiment, referring to FIGS. 9 and 10, an outlet 340, 440 may exist that allows the user to unload the device 310, 410 of any objects collected through the inlet 330, 430. The user may unload the objects into buckets, boxes, cages, or any other retaining structure. The outlet 340 may comprise a second opening 324 in the bag 320, such as a hole or slit, on a side thereof, with a first opening 322 existing as an inlet 330 and attaching to the frame 311. Each opening 322, 324 has a periphery. The periphery of the first opening 322 may be used to attach the first opening 322 to the frame 311. Alternatively, the outlet 440 may be formed from a single opening 422 in the bag 420, where the frame 411 parses the single opening 422 into an inlet 430 and an outlet 440. To achieve this, a portion 424 of the bag opening 422 remains unattached to the frame 411, with a portion of the frame 411a remaining bare. This leaves the unattached portion 424 to act as an outlet 440 along a side of the frame 411. Consequently, the inlet 430 is generally defined by the frame 411, being adjacent to or circumscribing the inlet 430, while the outlet 440 is defined by the unattached or free portion 424 of the bag opening and the bare portion 411a of the frame. It is contemplated that the outlet 340, 440 may occur along any side of the frame 311, 411. Attaching a portion of bag opening 422 to the frame 411 may occur by any means previously discussed above, including using the periphery of opening 422.

Although the invention has been described herein with reference to the present embodiments, it will become apparent to those skilled in the art that various modifications of the present embodiments of the invention as described herein can be made without departing from the spirit or scope of the invention as defined by the appended claims.

What is claimed is:

1. A collecting and unloading device comprising:
    a substantially rectangular frame comprising an upper bar, a lower bar, and two opposing side bars;
    a bag having an inlet and an outlet, the inlet being exclusive of the outlet, wherein the bag operably attaches to said frame, the frame being substantially adjacent the inlet and the outlet being substantially adjacent a side bar; and
    an elongated handle secured to said upper bar of said frame,
    wherein the bag further comprises a horizontal floor portion extending from said lower bar, a rear wall portion extending downward from said upper bar and integral with said floor portion, and two side portions, each of said side portions secured to one of said side bars and integral with said floor and rear wall portions of said bag, and whereby spatially said frame is within a plane oriented at an acute angle rearward relative to said horizontal floor portion of said bag.

2. The device of claim 1, wherein the bag further comprises a horizontal floor portion secured to said lower bar of said frame and extending rearward therefrom, said floor portion further configured such that during use of said device, said floor portion is positioned flat against a ground/floor surface.

3. The device of claim 1, wherein the floor portion and the rear wall are rectangular and the side portions are triangular, such that said bag, in combination with said frame, has a triangular configuration defined by said side walls, rear wall, floor and said frame.

4. The device of claim 1, wherein the lower bar includes a substantially flat top surface.

5. The device of claim 1, wherein said handle is adjustable.

6. The device of claim 1, wherein said bag is formed of a material having a sufficiently smooth surface, thereby allowing said bag to move freely along an area of ground.

7. The device of claim 1, wherein said lower bar comprises a top surface and a bottom surface, the surfaces being substantially flat and converging to a leading edge, such that an acute angle exists between the top and bottom surfaces.

8. A collecting and unloading device comprising:
a frame having an upper bar, a lower bar, and two opposing side bars;
a bag having a closed end, an open end, and a wall extending from the open end to the closed end, the open end comprising a first section and a notched section, wherein the first section has an edge and at least a portion of the edge operably attaches to the frame, wherein the notched section extends from the first section along the wall towards the closed end;
an elongated handle secured to the frame,
wherein the bag further comprises a horizontal floor portion extending from said lower bar, a rear wall portion extending downward from said upper bar and integral with said floor portion, and two side portions, each of said side portions secured to one of said side bars and integral with said floor and rear wall portions of said bag, and whereby spatially said frame is within a plane oriented at an acute angle rearward relative to said horizontal floor portion of said bag.

9. A collecting and unloading device comprising:
a frame having an upper bar, a lower bar, and two opposing side bars;
a bag having a closed end, an open end, and a wall extending from the open end to the closed end, the open end comprising a first section and a notched section, wherein the first section has an edge and at least a portion of the edge operably attaches to the frame, wherein the notched section extends from the first section along the wall towards the closed end;
an elongated handle secured to the frame,
wherein said lower bar comprises a top surface and a bottom surface, the surfaces being substantially flat and converging to a leading edge, such that an acute angle exists between the top and bottom surfaces.

10. The device of claim 9, wherein the bag further comprises a horizontal floor portion secured to said lower bar of said frame and extending rearward therefrom, said floor portion further configured such that during use of said device, said floor portion is positioned flat against ground/floor surface.

11. The device of claim 9, wherein the bag further comprises a horizontal rectangular floor portion extending from said lower bar, a rectangular rear wall portion extending downward from said upper bar and integral with said floor portion, and two triangular side portions, each of said side portions secured to one of said side bars and integral with said floor and rear wall portions of said bag, such that said bag, in combination with said frame, has a triangular configuration defined by said side walls, rear wall, floor and said frame.

12. The device of claim 9, wherein said handle is adjustable.

13. The device of claim 9, wherein said bag is formed of a material having a sufficiently smooth surface, thereby allowing said bag to move freely along an area of ground.

14. A method of collecting and unloading one or more objects comprising:
positioning a device comprising: a substantially rectangular frame comprising an upper bar, a lower bar, and two opposing side bars; a bag having an inlet and an outlet, the inlet being exclusive of the outlet, wherein the bag operably attaches to said frame, the frame being substantially adjacent the inlet and the outlet being substantially adjacent a side bar; and an elongated handle secured to said upper bar of said frame;
grasping said handle;
pushing said device via said handle along a surface toward at least one object to be collected, such that said lower bar slides underneath said at least one object, thereby moving said at least one object into said bag for collection; and
tilting said device by rotating the handle about a central axis of the handle, such that at least one of the at least one objects exits the device via the outlet, thereby unloading at least one of the at least one objects from the device.

15. The method of claim 14, wherein the lower bar includes a substantially flat top surface.

16. A method of collecting and unloading one or more objects comprising:
positioning a device comprising: a frame having an upper bar, a lower bar, and two opposing side bars; a bag having a closed end, an open end, and a wall extending from the open end to the closed end, the open end comprising a first section and a notched section, wherein the first section has an edge and at least a portion of the edge operably attaches to the frame, wherein the notched section extends from the first section along the wall towards the closed end; and an elongated handle secured to the frame;
grasping said handle;
pushing said device via said handle along a surface toward at least one object to be collected, such that said lower bar slides underneath said at least one object, thereby moving said at least one object into said bag for collection; and
tilting said device by rotating the handle about a central axis of the handle, such that at least one of the at least one objects exits the device via the outlet, thereby unloading at least one of the at least one objects from the device.

17. The method of claim 16, wherein the lower bar includes a substantially flat top surface.

* * * * *